United States Patent
Kusy et al.

(10) Patent No.: US 10,431,844 B2
(45) Date of Patent: Oct. 1, 2019

(54) METHOD FOR PRODUCING A CATALYTICALLY COATED MEMBRANE AND MEMBRANE ELECTRODE ASSEMBLY AND FUEL CELL STACK HAVING SAME

(71) Applicants: VOLKSWAGEN AG, Wolfsburg (DE); AUDI AG, Ingolstadt (DE)

(72) Inventors: Matej Kusy, Burnaby (CA); Sabina Russell, Burnaby (CA); Alexander Leung, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 43 days.

(21) Appl. No.: 15/547,046

(22) PCT Filed: Jan. 26, 2016

(86) PCT No.: PCT/EP2016/051501
§ 371 (c)(1),
(2) Date: Jul. 27, 2017

(87) PCT Pub. No.: WO2016/120233
PCT Pub. Date: Aug. 4, 2016

(65) Prior Publication Data
US 2018/0013165 A1 Jan. 11, 2018

(30) Foreign Application Priority Data
Jan. 29, 2015 (DE) .................. 10 2015 201 548

(51) Int. Cl.
*H01M 4/86* (2006.01)
*H01M 4/88* (2006.01)
(Continued)

(52) U.S. Cl.
CPC ......... *H01M 8/242* (2013.01); *H01M 4/8626* (2013.01); *H01M 4/881* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

| 8,101,320 B2 | 1/2012 | Skala |
| 2006/0216563 A1 | 9/2006 | Matsunaga |

(Continued)

FOREIGN PATENT DOCUMENTS

| DE | 10 2007 008 214 A1 | 8/2007 |
| DE | 11 2012 000 558 T5 | 10/2013 |
| EP | 1 296 399 A1 | 3/2003 |

*Primary Examiner* — Jonathan Crepeau
(74) *Attorney, Agent, or Firm* — Seed IP Law Group LLP

(57) ABSTRACT

The invention relates to a method for producing a catalyst coated membrane (19) for a fuel cell (10), wherein the catalyst coated membrane (19) has a membrane (11) and a catalyst layer (12, 13) of a catalytic material arranged on at least one of its flat sides, as well as a nonrectangular active area (20), which is restricted in one direction by two outer sides (30) opposite one another. The method comprises a continuous application of the catalytic material to a membrane material (33) while creating a constant coating width (B) such that an area (35) coated with the catalytic material corresponds to at least the active area (20). A provision is that the membrane material (33) be coated with the catalytic material such that a coating direction (D) has an angle with respect to the opposite outer sides (30) of the active area (20) that is not equal to 90° and not equal to 0°.

16 Claims, 5 Drawing Sheets

(51) Int. Cl.
    *H01M 8/10*     (2016.01)
    *H01M 8/242*     (2016.01)
    *H01M 8/1004*     (2016.01)
    *H01M 8/1018*     (2016.01)

(56) References Cited

U.S. PATENT DOCUMENTS

| | | |
|---|---|---|
| 2010/0239931 A1 | 9/2010 | Ishida et al. |
| 2012/0125211 A1* | 5/2012 | Baumann ................ B41M 1/10 101/170 |
| 2014/0087284 A1 | 3/2014 | Ueda |

* cited by examiner

METHOD FOR PRODUCING A CATALYTICALLY COATED MEMBRANE AND MEMBRANE ELECTRODE ASSEMBLY AND FUEL CELL STACK HAVING SAME

The invention relates to a method for producing a catalyst coated membrane having a membrane and a catalyst layer, of a catalytic material, arranged on at least one of its flat sides. The invention further relates to a membrane electrode assembly having such a catalyst coated membrane as well as a fuel cell comprising a plurality of such membrane electrode assemblies, which are alternately stacked with bipolar plates.

Fuel cells use the chemical conversion of a fuel with oxygen into water in order to generate electrical energy. Fuel cells contain the so-called membrane electrode assembly (MEA), which is a combination of an ion-conducting (usually proton-conducting) membrane and an electrode (anode and cathode) on each side of the membrane. In addition, gas diffusion layers (GDL) can be arranged on both sides of the membrane electrode assembly on the sides of the electrodes facing away from the membrane. Generally, the fuel cell is formed by a plurality of MEAs arranged in the stack, the electrical power outputs of which add up. Between the individual membrane electrode assemblies, bipolar plates (also called flux field plates) are usually arranged, which ensure a supply of the individual cells with the operating media, i.e. the reactants, and are usually also used for cooling. In addition, the bipolar plates ensure an electrically conductive contact to the membrane electrode assemblies.

During operation of the fuel cell, the fuel, especially hydrogen $H_2$ or a gas mixture containing hydrogen, is supplied to the anode over an open flux field of the bipolar plate on the anode side, where electrochemical oxidation of $H_2$ to $H^+$ with loss of electrons takes place. A transport of the $H^+$ protons from the anode chamber into the cathode chamber is effected via the electrolytes or the membrane, which separates the reaction chambers from each other in a gas-tight and electrically insulated manner (in a water-bound or water-free manner). The electrons provided at the anode are guided to the cathode via an electrical line. The cathode receives oxygen or a gas mixture containing oxygen (such as air) via an open flux field of the bipolar plate on the cathode side, so that a reduction of $O_2$ to $O^{2-}$ with gain of electrons takes place. At the same time, the oxygen anions react in the cathode chamber with the protons transported via the membrane to form water.

The electrodes of a fuel cell are typically present as a catalyst coating on the gas diffusion layers, which are then characterized as gas diffusion electrodes or as a catalyst coating on the membrane. In the latter case, it is also referred to as a catalyst coated membrane or CCM. The process of coating a membrane material with a catalytic material and thus to produce the catalyst layers in order to produce a CCM is known in various techniques. These include printing processes, spray processes, deposition processes, paint-coating processes, etc. For mass production, economical processes with high production rates are desirable.

That particular area of a MEA that is impacted with both reactant gases in the fuel cell stack for the anode and cathode and on which the fuel cell reaction takes place with the generation of electricity is characterized as the active area. The active area, however, only takes up a part of the total surface area of the MEA. The remaining areas, which may have a variable shape, are used to supply and distribute the operating media to the active area and to seal off and mechanically stabilize the MEA. These areas are characterized as not active or inactive areas. In conventional fuel cells, the active area has at least one rectangular shape. In the effort to achieve a high utilization of surface area for the active area, assemblies have been developed recently with nonrectangular active areas, for example with a regular or irregular hexagonal contour as shown in FIG. 2. For cost reasons, it is essentially desirable to only equip the active area with the catalyst layer. The selective coating of only the active area is possible with printing processes, for example with offset or screen printing. These processes, however, are comparatively slow in the case of screen printing, or require cost-intensive machinery (offset printing). Continuous coating processes, on the other hand, in which the membrane material is continuously coated with the catalytic material and the catalyst coated membrane is subsequently cut out using an assembly cut, are quicker and less labor-intensive. The disadvantage here is that, in the case of nonrectangular active areas, the coating of inactive areas of the membrane or of the membrane offcut is unavoidable. To the extent that inactive areas are adversely coated with catalytic material, these areas must be subsequently blocked, for example, by applying diffusion barrier layers. In any case, the excess coating represents a loss of catalytic material.

DE 11 2012 000 558 T5 describes a catalyst coated membrane (CCM) of a membrane electrode assembly for a fuel cell with a rectangular active area, which adjoins meander-shaped flux fields of the anode and cathode operating media in the fuel cell. In order to achieve a more effective use of the catalyst, the catalyst quantity per unit of surface area in the center area of the active surface is greater than in an edge area surrounding it. In addition, the quantity of catalyst decreases in the direction of the main flow of the reactant gases. The different catalyst quantities are realized through different layer thicknesses. The production takes place through spraying a catalyst ink on a membrane, in which edge areas not to be coated are covered with a mask.

According to EP 1 296 399 A1, a catalytic layer is generated on [a] polymer electrolyte membrane through continuous spraying of a catalyst ink. The coating direction extends in this case orthogonally with respect to the subsequent main flow direction of the reactant gases. In order to achieve a variation of the catalyst properties, particularly of the catalyst concentration in the main flow direction, a spray tool is used for production, the longitudinal opening of which is subdivided into two or more compartments, with which different catalyst inks can simultaneously be applied, which are superimposed on one another with graduating layer thicknesses.

The object of the invention is then to define a method of production with the catalyst coated membrane (CCM) for fuel cells that is economical and has a high production rate.

This object is achieved through a method as well as a membrane electrode assembly as well as a fuel cell stack having the features of the independent claims. The method according to the invention thus relates to the production of a catalyst coated membrane (CCM) for a fuel cell, in which the catalyst coated membrane has a membrane and a catalyst layer (anode and/or cathode) of a catalytic material arranged on at least one of its flat sides. The catalyst coated membrane to be produced with the method further has a nonrectangular active area, which is restricted in one direction by two outer sides, which are opposite one another. In particular, said outer sides of the active area correspond to a main flow direction of the reactant gases (anode and cathode operating media) in the fuel cell stack and extend preferably parallel with respect to one another as well as parallel with respect to two corresponding outer edges of the CCM. The method comprises a continuous application of the catalytic material to a membrane material while creating a constant coating width such that an area coated with the catalytic material corresponds to at least the active area, i.e. covers the active area. According to the invention, the membrane measuring material is coated with the catalytic material such that a coating direction has an angle with respect to the outer sides, which are opposite one another, of the active area that is not equal to 90° and not equal to 0°. In other words, the coating takes place neither orthogonally nor parallel to the two opposite outer sides of the active area of the catalyst coated membrane. Due to the swiveling of the coating direction according to the invention, surface areas are reduced compared to conventional methods, which are adversely coated with a catalytic material. In this manner, the required quantity of catalytic material is reduced. At the same time, the method involves a continuous coating process in which a continuous coating surface of constant width and rectangular shape is created and that is suitable particularly as well for a rolling process while using a membrane material in the form of a continuous strip.

In a preferred embodiment of the invention, the active area has a contour with at least four corners, which is restricted by the two said (corresponding to the main flow direction of the operating media) outer sides opposite one another as well as at least one first pair of short sides opposite one another. In particular, the active area has a contour with at least six corners, which is restricted by the two outer sides as well as at least two additional pairs of short sides opposite one another. Preferably, the coating direction has an angle with respect to the first pair, which is at most 10°, or particularly at most 5°, and preferably 0° to the extent possible. Because the inactive areas of the catalyst coated membrane primarily adjoin these short sides, a coating of the nonactive areas can be limited or prevented to a great extent in this manner. Preferably, the coated area ends laterally with the first pair of short sides of the active area of the catalyst coated membrane. In an especially preferred embodiment, the active area has a hexagonal contour, which is restricted by the two opposite outer sides as well as by precisely two pairs of opposite short sides. In addition, the short sides of a pair and/or the opposite outer sides are preferably arranged parallel to one another. All of these aforementioned embodiments lead to a further reduction of excessively coated areas of the membrane material and thus to a savings of catalytic material.

According to a preferred embodiment of the method, a plurality of catalyst coated membranes is produced through continuous coating of the membrane material, in which the outer sides of the active areas of adjacent catalyst coated membranes are arranged parallel to one another on the membrane material, preferably with the least amount of distance with respect to one another. In this manner, an offcut of membrane material is reduced, on one hand, and, on the other hand, the surface of membrane material adversely coated with the catalytic material is also reduced.

With particular advantage, the membrane material has a strip-like offcut with two parallel longitudinal sides and is particularly formed as a continuous strip, which can be supplied and transported, for example, on rollers. In this case, the coating direction extends preferably parallel to the longitudinal sides of the strip-like membrane material. This embodiment enables the application of a continuous coating area over the length of the membrane material and thus a high production rate.

In a preferred embodiment, the plurality of catalyst coated membranes is thus arranged on the membrane material such that the first short sides of the active areas are oriented parallel to the longitudinal sides of the strip-like membrane material. In this manner, the roller direction of the membrane material is brought in conformance with the coating direction and the width of the coating surface can be oriented to the first short sides of the active areas.

Preferably, there is an assembly step after application of the catalytic material in which the membrane material is cut according to a desired shape of the catalyst coated membrane to be produced. In other words, the catalyst coated membrane is cut from the membrane material. In this manner, the catalyst coated membrane is brought to the necessary dimension.

Furthermore, it is advantageous when catalytic material that was applied in areas outside of the catalyst coated membrane to be produced on the membrane material is removed and recycled, preferably after the production of the membrane material. Thus, the expensive catalytic material is not lost without being used.

Basically, any known process can be used to apply the catalytic material to the membrane material. However, the invention enables the selective but expensive and slow printing processes to be dispensed with. Preferably, the application of the catalytic material takes place through spraying, spreading, or rolling. These techniques are characterized in that they can be implemented with less labor and high production rates and additionally can be integrated into the continuous roller processes. The catalytic material in this case is used, for example, in an aqueous or nonaqueous solvent as a more or less viscous paste or as a liquid suspension or solution. The solvent is removed after the application and before or after the manufacturing through active or inactive drying processes.

A further aspect of the present invention relates to a membrane electrode assembly comprising a catalyst coated membrane, which is produced or can be produced according to the method in accordance with the invention. The membrane electrode assembly comprises, in addition to the catalyst coated membrane, various operating media ports (passage openings), for supplying and removing operating media to and from the fuel cell, which are arranged outside of the nonrectangular active area. Preferably, it further comprises a protective layer arranged on one or both sides, which surrounds the CCM and particularly the operating media ports like a frame and is used for mechanical stabilization. As an option, seals can be arranged on the membrane electrode assembly. Typically, the coating direction used during production can be verified, for example, through microscopic inspections of the CCM. Furthermore, the coating direction can be retraced using the edge areas of the coating area.

In addition, the invention relates to a fuel cell stack comprising a plurality of membrane electrode assemblies alternately stacked with bipolar plates according to the invention. The fuel cell stack can particularly be used in an aircraft having an electromotor drive, in which the fuel cell stack is used to supply electricity to the electric motor and/or a traction battery.

Additional preferred embodiments of the invention arise from the other features stated in the dependent claims.

The various embodiments of the invention mentioned in this application may be combined advantageously with one another unless stated otherwise in individual cases.

The invention is explained below in exemplary embodiments on the basis of the respective drawings. The following is shown:

FIG. 1 shows a cutout of a fuel cell stack, designated overall with 100, of which only two individual fuel cells 10 are shown here.

Figure 1:
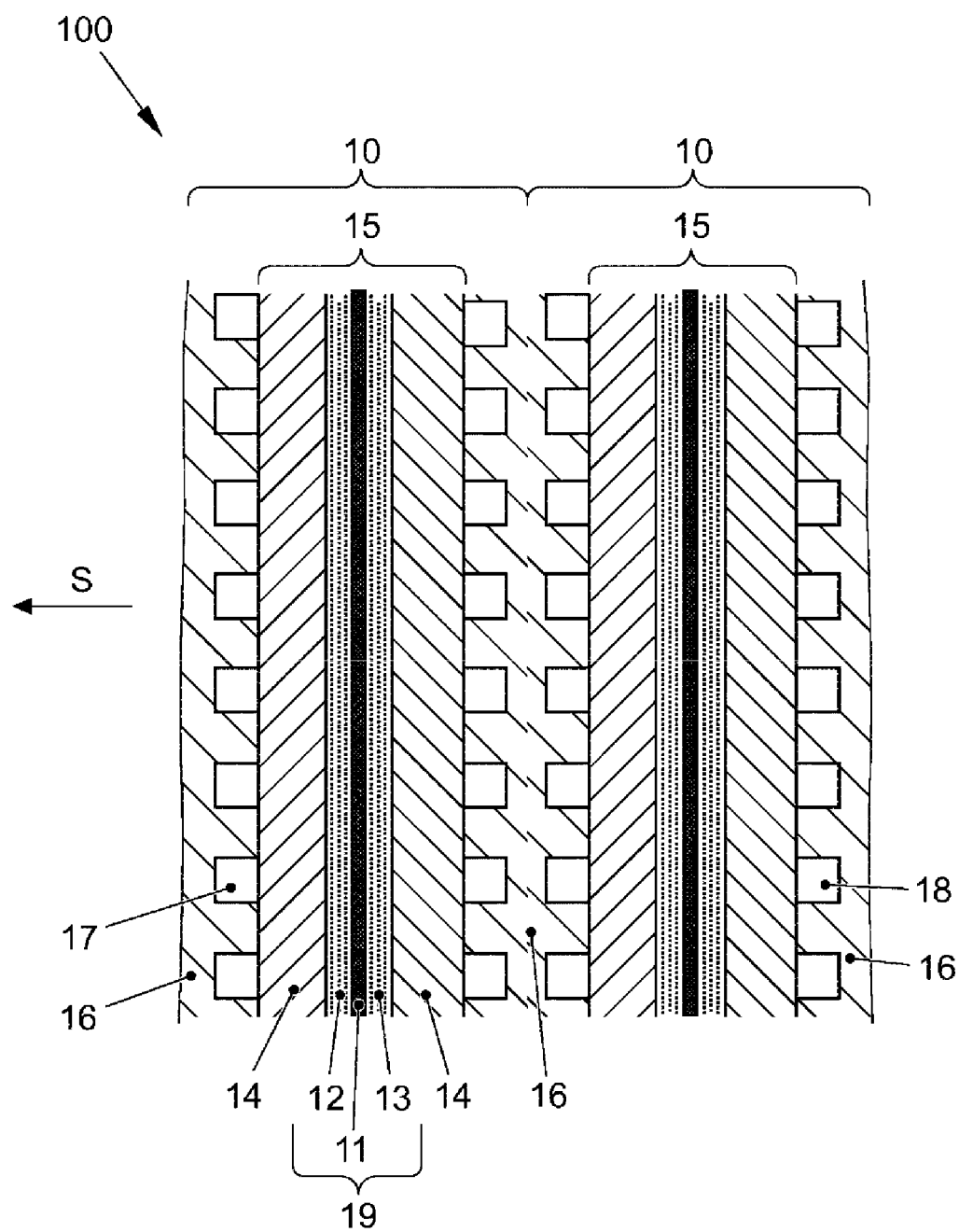
FIG. 1 shows a schematic cross-sectional view of a fuel cell stack.

Each fuel cell 10 has a polymer electrolyte membrane 11, which consists of an electrolytically conductive polymer material, which is particularly capable of conducting protons. Typically, the polymer material requires a certain humidity to maintain its electrolytic conductivity. A catalyst layer adjoins both flat sides of the membrane 11, namely an anode catalyst layer 12 and a cathode catalyst layer 13. The catalyst layers, 12 and 13, comprise a catalytic material, which is typically a precious metal, particularly platinum. Typically, the catalyst layers 12, 13 further comprise a porous, electrically conductive carrier material, on which the catalytic material is finely dispersed, for example a carbon-based material. The catalyst layers 12, 13 may further comprise components, for example polymer binder materials and the like.

A gas diffusion layer (GDL) 14 adjoins each catalyst layer 12, 13. The GDL comprises a material, through which liquids can flow, which is likewise electrically conductive. For example, the GDL 14 comprises a carbon-based foam or paper material. The structure made up of membrane 11, the catalyst layers 12, 13, as well as the gas diffusion layers 14 is also characterized as the membrane electrode assembly 15, in which the allocation of the gas diffusion layers 14 to the membrane electrode assembly 15 varies in the literature.

A bipolar plate 16, also characterized as the flow field plate or flux field plate, is arranged between each of two membrane electrode assemblies 15. On its anode side, the bipolar plate 16 has anode flow channels 17, by means of which an anode operating media (fuel), particularly hydrogen, is routed to the anode catalyst layer 12. Furthermore, on its cathode side, the bipolar plate 16 has cathode flow channels 18, by means of which a cathode operating gas, which is typically an oxygen-containing gas, usually air, is routed to the cathode catalyst layer 13. Typically, the bipolar plate 16 further has internal coolant channels, not shown here, through which a coolant can be routed for cooling the fuel cell stack 100. The bipolar plate 16 is produced from an electrically conductive material, for example a metal, a metal alloy, graphite, or an electrically conductive polymer material or polymer composite material. The bipolar plate 16 thus combines the functions of the operating media supply, the cooling, as well as the electrical connection of the catalytic electrodes 12, 13 to an external current circuit.

Typically, a plurality of such type of individual cells 10 are arranged in a fuel cell stack 100, the electrical power outputs of which accumulate. For electric vehicle applications, fuel cell stacks 100 typically comprise several hundred individual cells 10.

The catalyst layers, 12 and 13, may be present, on one hand, as a coating on the membrane 11. In this case, this is also considered to be a catalyst coated membrane or CCM, which is designated overall with 19 in FIG. 1. Alternatively, the catalyst layers, 12 and 13, may be present as a coating of the gas diffusion layers 14 such that they are then characterized as gas diffusion electrodes. The present invention primarily relates to the case of a catalyst coated membrane 19 as well as a method for the production thereof.

Figure 2:
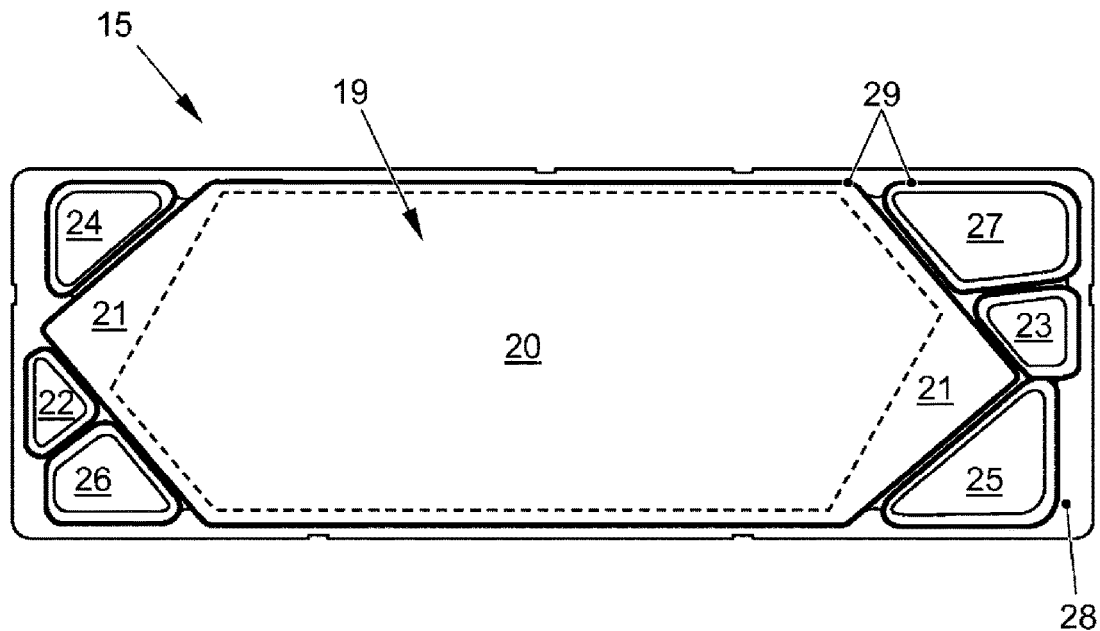
FIG. 2 shows a view of a membrane electrode assembly with a nonrectangular active area.
Figure 3:
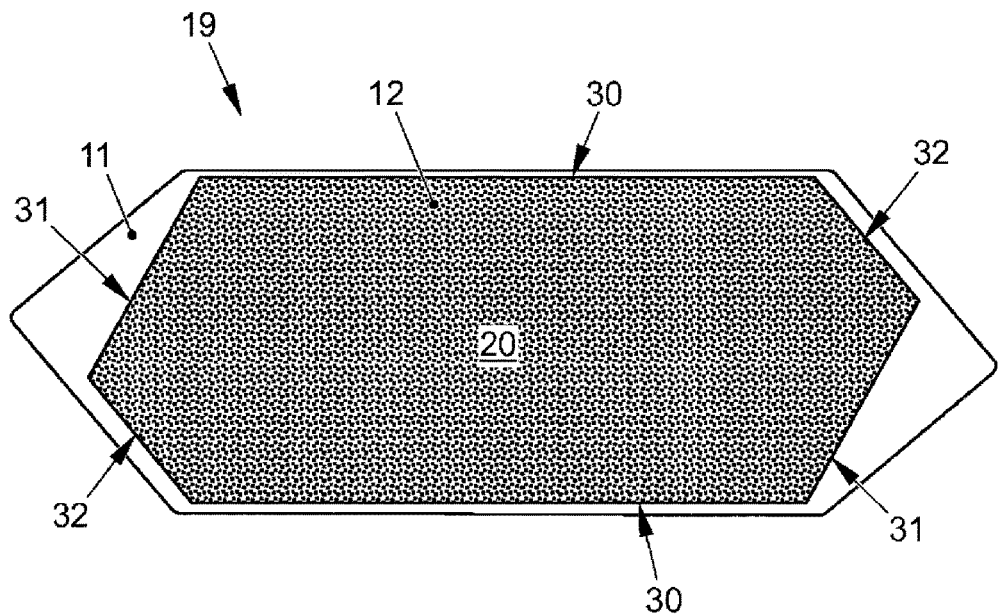
FIG. 3 shows a view of a catalyst coated membrane of the membrane electrode assembly according to FIG. 2.

FIG. 2 shows a membrane electrode assembly 15 with a view of its flat sides. The membrane electrode assembly 15 has the catalyst coated membrane 19, which is also shown in FIG. 3 in isolated form. In the example shown, the catalyst coated membrane 19 has a hexagonal contour. Within this hexagonal contour, an active area 20 is arranged, which is indicated by a dashed line. Outside of the active area 20, the catalyst coated membrane 19 has inactive areas 21. The active area 20 is characterized in that the fuel cell reactions take place at the anode and cathode and thus electricity is generated in a fuel cell stack 100 in this area in the installed state of the membrane electrode assembly 15. The inactive areas 21, on the other hand, are used for other functions, for example to supply operating media to the active area 20. Ideally, the polymer electrolyte membrane 11 is only coated with the catalyst coatings, 12 and 13, in the active area 20, as is shown in FIG. 3.

The membrane electrode assembly 15 comprises various passage openings, 22 to 27, which are used to supply and remove the various operating media. Thus, a first anode port 22 is used to supply the anode operating gas to the cathodes 12 of the fuel cell stack 100 and an opposing second anode gas port 23 is used to remove the anode operating gas. Likewise, a first cathode port 24 is used to supply a cathode operating gas to the cathodes 13 of the fuel cell stack 100 and an opposing second cathode gas port 25 is used to remove the cathode operating gas. Finally, a first coolant port 26 is used to supply a coolant to the internal coolant channels of the bipolar plates 16 and an opposing second coolant port 27 is used to remove the coolant. The bipolar plates 16, which are not shown in detail, have an essentially equivalent cut as the membrane electrode assembly 15 shown, particularly corresponding ports. In this manner, in the stacked state of the membrane electrode assemblies 15 and bipolar plates 16, operating media main channels are formed, which implement the fuel cell stack 100 in its stack direction S (see FIG. 1). (These operating media main channels are not shown in FIG. 1, which only shows a section through the active area 20 of the fuel cell stack.) The anode and cathode ports, 22 to 25, are connected to the corresponding anode and/or cathode channels 17, 18 of the bipolar plates 16 so as to convey fluid by means of open distribution channels of the bipolar plates 16 adjoining in the stack 100. The coolant ports 26, 27 are connected to the internal coolant channels of the bipolar plates 16. The distribution channel structures connecting the ports 22-27 and the anode and/or cathode channels 17, 18 of the active area 20 extend into the inactive areas 21.

For mechanical support, the membrane 11 is typically enclosed on both sides by a support layer 28, which encloses the membrane 11 at its edge areas. Optionally, the membrane 11 can also extend over the entire surface of the membrane electrode assembly 15 and be laminated on its edge areas with support layers 28. Furthermore, there are seals 29 discernible in FIG. 2, which enclose the operating media passage openings, 22 to 27, as well as the catalyst coated membrane 19, in order to seal it off with respect to the outside. Optionally, the seals 29 can be arranged on the bipolar plates 16 instead of on the membrane electrode assembly 15 or may be arranged on both.

As previously explained, the fuel cell reaction takes place only in the active area 20. Thus, the target is to apply the catalyst layers, 12 and 13, only in this area to the extent possible, because the catalytic material represents the most expensive individual component of the fuel cell stack by far. On the other hand, the target is to keep the active area 20 as large as possible and the inactive areas 21 as small as possible in order to achieve the maximum extent of energy yield and to minimize the required installation space and the weight of the fuel cell. The contours of the active area 20 accordingly resulting from said targeting may deviate from the conventional rectangular contour and have an irregular contour. For example, a hexagonal contour of the active area 20 results as shown in FIGS. 2 and 3. This contour is restricted in a direction extending parallel to the main flow direction of the operating media by two parallel outer sides 30 opposite one another. The irregular hexagonal contour of the active area 20 shown further has a first pair of short sides 31 opposite one another as well as a second pair of short sides 32 opposite one another. In doing so, short sides 31 have a longer length than short sides 32.

The economical and time-saving mass production of catalyst coated membranes 19 with a nonrectangular active area has only been achieved in an unsatisfactory manner until now. For example, the production through selective coating processes can take place in which the catalytic material is exclusively applied to the active area 20 of a membrane material, for example through selective print processes such as print screening or offset screening. These processes, however, are characterized by a slow production speed (print screening) or by cost-intensive machines (offset printing). On the other hand, continuous coating processes in which the catalytic material is applied with the creation of a constant coating width on the membrane material are quicker and more cost-efficient. This is shown in the example from FIG. 4, which represents such a continuous coating process according to the prior art.

Figure 4:
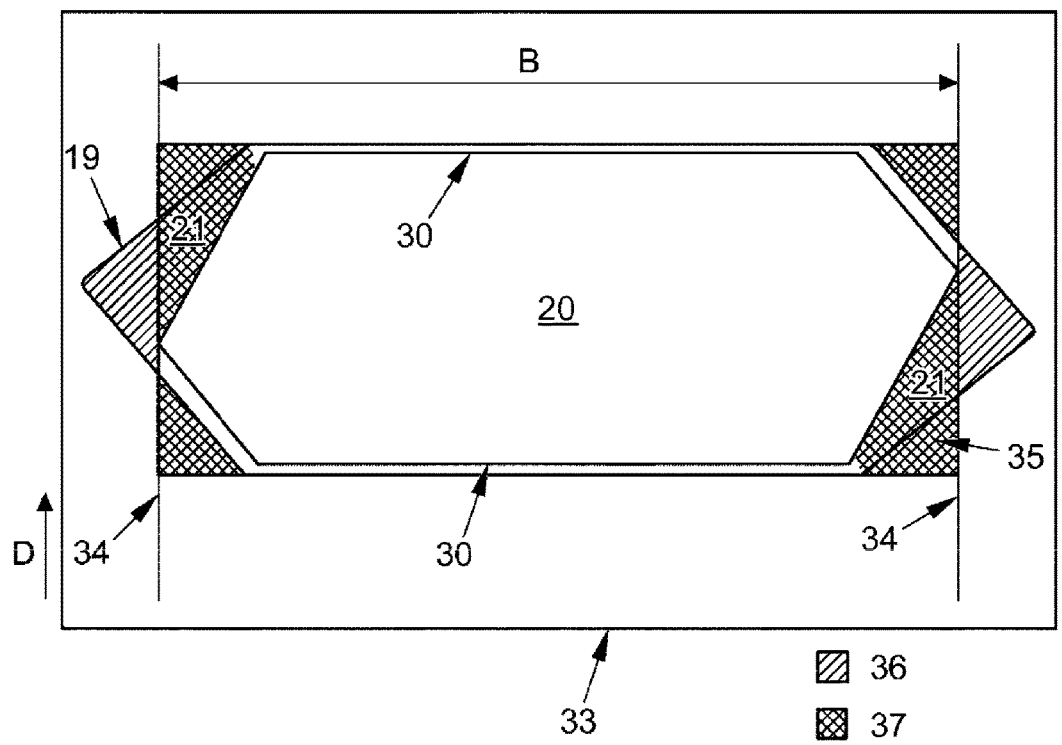
FIG. 4 shows the production of a catalyst coated membrane according to FIG. 3 with a method according to the prior art.

In FIG. 4, 33 designates the membrane material on which the catalyst material is applied along a continuous track of the width B, restricted by the longitudinal sides 34. FIG. 4 also shows the catalyst coated membrane 19 to be cut out in a subsequent manufacturing step of the process as well as the desired active area 20. In doing so, the application direction D according to the prior art extends in a direction that is aligned orthogonally, that is 90°, with respect to the two outer sides 30 of the active area that are aligned opposite one another. Thus, this results in a coated area 35 with rectangular contour. The coated area 35 according to the prior art, however, not only covers the active area 20 but also parts of the inactive areas 21 of the catalyst coated membrane 19 as well as protruding offcut areas that are cut off by subsequent manufacturing. Only the simply hatched areas 36 of the catalyst coated membrane 19 remain uncoated. The cross-hatched areas 37, on the other hand, are coated with catalytic material according to the conventional methods although it is not necessary at this point. This leads, on one hand, to unnecessary high costs for the catalytic material and, on the other hand, to the requirement to block these adversely coated areas 37, for example by applying gas barrier layers in order to prevent fuel cell reaction in these areas.

Figure 5:
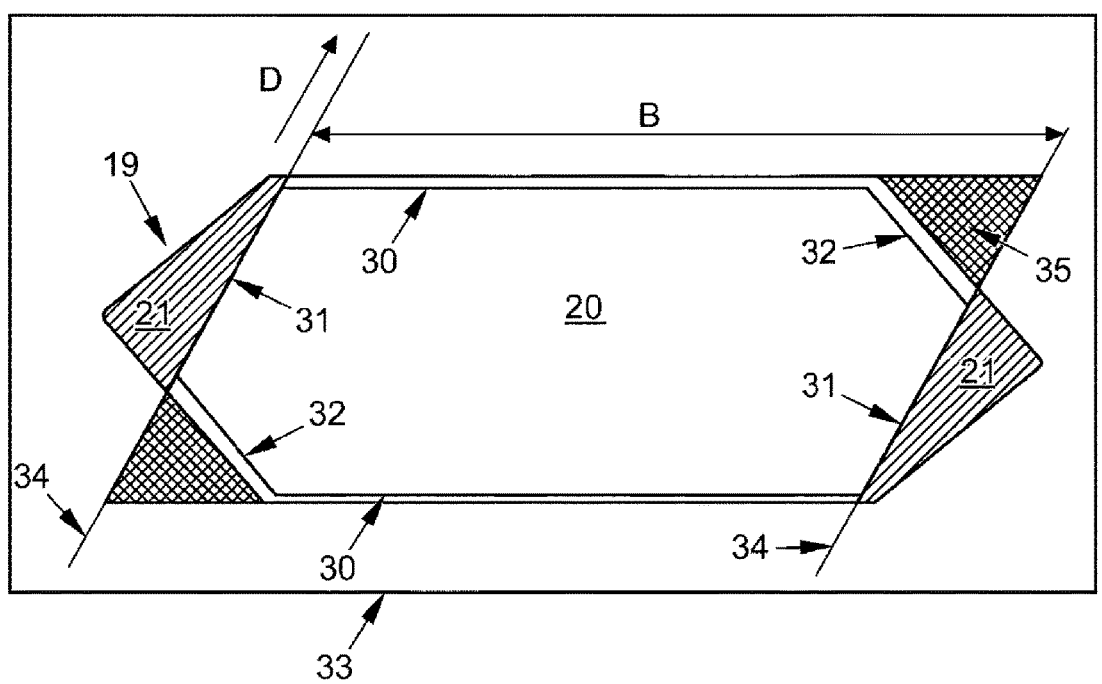
FIG. 5 shows the production of a catalyst coated membrane according to FIG. 3 with a method according to a first embodiment of the invention.

According to the invention, the known continuous process is thus converted in that the membrane material is coated with the catalytic material such that the coating direction D has an angle with respect to the opposite outer sides 30 of the active area 20, which is not equal to 90°, differently than in FIG. 4. This principle is represented in FIG. 5. Thus, the catalytic material is applied to the membrane material 33 in a continuous process while generating a coated surface 35 with a constant coating width B. The coating direction D here, however, does not extend orthogonally with respect to the progression of the outer sides 30 of the active area 20 as in FIG. 4 (and also not parallel to the outer sides 30, as is known from other processes). Instead, the coating direction D extends in a direction that most precisely corresponds to the direction of one of the two short side pairs 31, 32 of the active area 21, or preferably the longer short sides 31.

As can be seen using the simple hatched areas 36, which characterize the non-coated area of the membrane 19 to be cut out, the inactive areas 21 of the catalyst coated membrane 19 are completely uncoated in the example shown. After the catalyst coated membrane 19 is cut out from the membrane material 33, only the cross-hatched areas 37 remain as excessively coated areas. The comparison of the (excessively) coated areas 37 of the method according to the invention according to FIG. 5 with those according to FIG. 4 shows that the invention can reduce said excessive coating significantly. The excessively coated areas 37 created in the method according to the invention have a surface that is smaller by 6 to 10% than according to conventional processes in which the coating direction D extends orthogonally with respect to the outer sides 30 of the active area 20. Furthermore, with the coating processes according to the invention, the excessively coated areas 37 (cross-hatching) are practically completely removed from the membrane material 33 upon subsequent manufacturing of the catalyst coated membrane 19. This enables a separation of the catalyst coating and the reuse of the catalytic material such that it essentially no longer remains unused in the process. The necessity of blocking undesirable catalytic material through barrier layers is omitted or is at least reduced.

Figure 6:
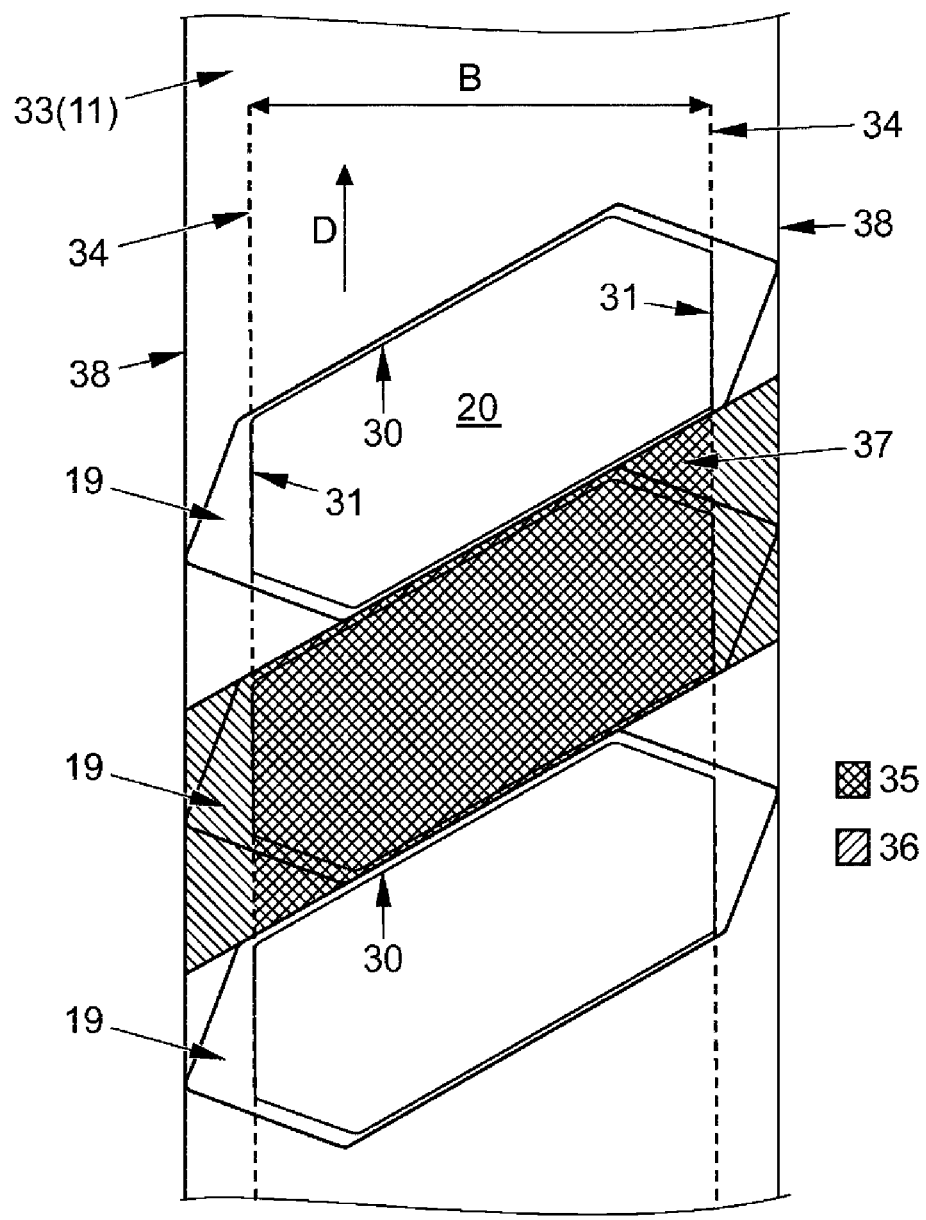
FIG. 6 shows the continuous production of a plurality of catalyst coated membranes according to FIG. 3 with a method according to a second embodiment of the invention.

FIG. 6 shows a further exemplary embodiment for continuous production of a plurality of catalyst coated membranes 19 according to FIG. 3 from a membrane material 33, which has a strip-like cut with parallel longitudinal sides 38, particularly a continuous strip, which is supplied on a roller (not shown). The catalyst coated membranes 19 to be produced here are arranged on the membrane material 33 such that the two outer sides 30 of the active areas 20 of the adjacent catalyst coated membranes 19 are aligned parallel with respect to one another. Simultaneously, the short sides 31 of the active areas 20 are oriented parallel to the longitudinal sides 38 of the membrane material 33. Consequently, the coating direction D extends parallel to the longitudinal sides 38 of the strip-like membrane material 33. An example of an individual catalyst coated membrane 19 to be created is the uncoated area 36 to the right and left, next to the longitudinal sides 34 of the coating area, characterized by simple hatching, while the continuously coated area 35 is emphasized by cross-hatching. After the catalyst coated membranes 19 have been cut out, thus only the rectangular excessively coated areas 37 here remain. These area 37 are preferably routed to recycling of the catalytic material after cutting. In this manner, the process can be implemented in a continuous roller process, in which the catalytic material is continuously applied to a moving membrane material 33 with a constant width B.

Figure 7:
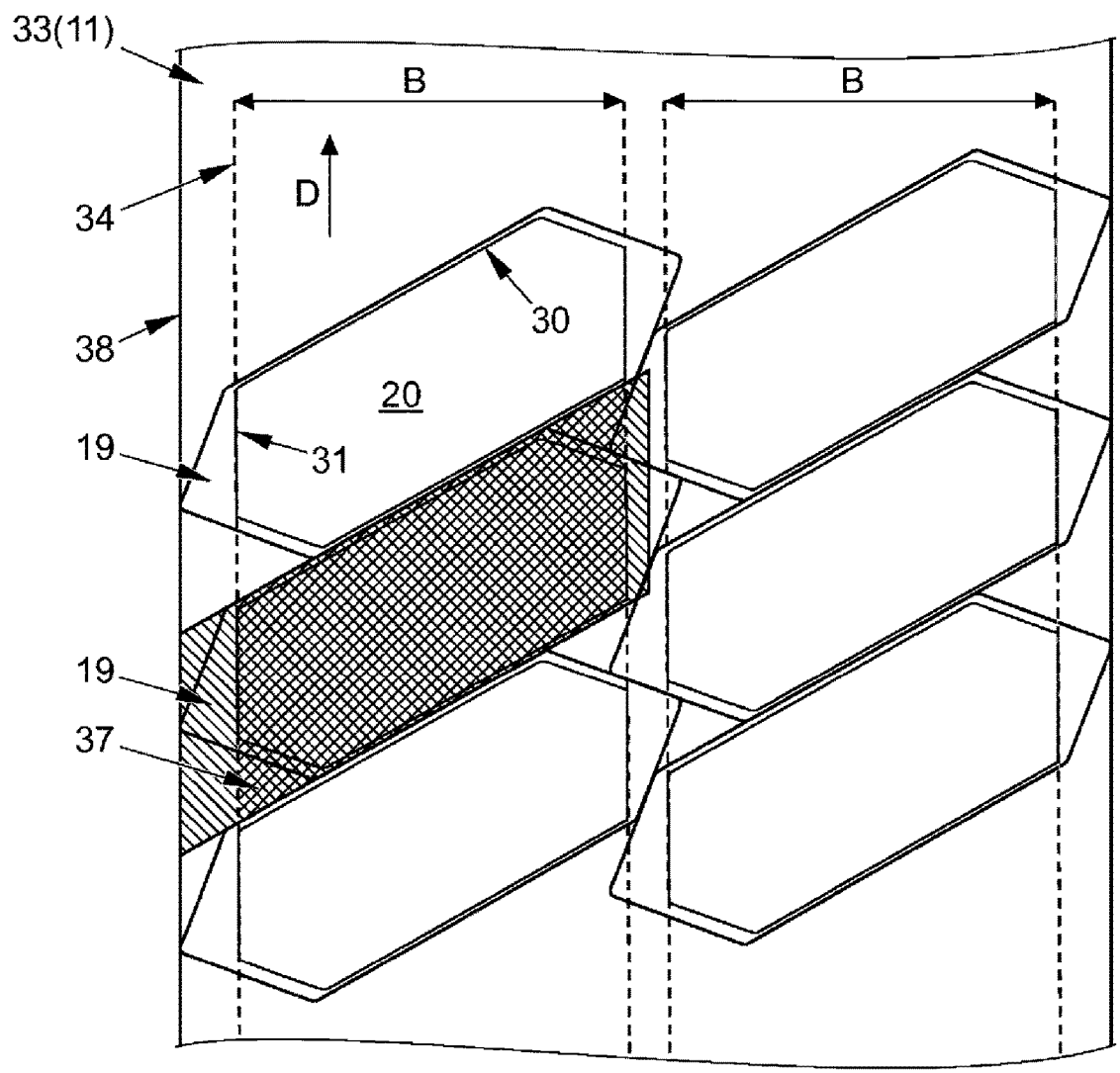
FIG. 7 shows the continuous production of a plurality of catalyst coated membranes according to FIG. 3 with a method according to a third embodiment of the invention.

A further advantageous embodiment of the method according to the invention is shown in FIG. 7. In this case, the catalyst coated membranes 19 to be created are arranged in two parallel rows on the membrane material 33. Their alignment regarding their outer sides 30 and short sides 31 of the catalyst areas 20 correspond to that in FIG. 6. In this process, the hexagonal membranes 19 are arranged embedded within one another such that their top ends engage with one another in an intermeshed manner. This arrangement enables the offcut of membrane material 33 to be reduced. In the example shown, about 7% membrane material 33 in relation to the overall surface area can be spared. In this example, two parallel surface-coated areas 35 are continuously created, each having a coating width B. It is obvious that also more than two parallel rows of catalyst coated membranes 19 can be produced in this manner.

REFERENCE LIST

100 Fuel cell stack
10 Fuel cell (individual cell)
11 Polymer electrolyte membrane
12 Anode catalyst layer/anode
13 Cathode catalyst layer/cathode
14 Gas diffusion layer
15 Membrane electrode assembly
16 Bipolar plate
17 Anode flow channels
18 Cathode flow channels
19 Catalyst coated membrane
20 Active area
21 Inactive area
22 First anode port
23 Second anode port
24 First cathode port
25 Second cathode port
26 First coolant port
27 Second coolant port
28 Support layer
29 Seal
30 Outer side of the active area
31 Short side of the active area
32 Short side of the active area
33 Membrane material
34 Longitudinal sides of the coated area
35 Coated area
36 Uncoated area
37 Excessively coated area
38 Longitudinal sides of the membrane material
B Coating width
D Coating direction
S Stack direction

The invention claimed is:

1. A method, comprising:
producing a catalyst coated membrane that has a membrane material and a catalyst layer of a catalytic material on a flat side of the membrane material including a nonrectangular active area, which is restricted in one direction by two outer sides opposite one another and extending parallel to each other, the producing including:
continuously applying the catalytic material to the flat side of the membrane material in a coating direction, the catalytic material having a constant coating width, the area of the membrane material coated with the catalytic material at least covers the nonrectangular active area of the catalyst coated membrane, the applying including:
coating the membrane material with the catalytic material such that the coating direction has an angle that is not equal to 90° and not equal to 0° with respect to the two outer sides of the nonrectangular active area.

2. The method according to claim 1 wherein the nonrectangular active area has at least four corners, which is restricted by the two outer sides and at least one first pair of sides opposite one another, and
wherein the coating direction has an angle that is a maximum of 10° with respect to the first pair of sides.

3. The method according to claim 2 wherein the area of the membrane material coated is bounded laterally by the at least one first pair of sides of the nonrectangular active area, wherein each of the at least one first pair of sides have a length that is less than a length of each of the two outer sides.

4. A method, comprising:
producing a plurality of catalyst coated membranes using a membrane material, the plurality of catalyst coated membranes each having a portion of the membrane material and a catalyst layer of a catalytic material on a flat side of the portion of the membrane material, each portion including a nonrectangular active area, which is restricted in one direction by two outer sides opposite one another and extending parallel to each other, the producing including:
continuous coating of the membrane material with the catalytic material in a coating direction, the catalytic material having a constant coating width, the area of each portion of the membrane material coated with the catalytic material at least covers the nonrectangular active area of a respective catalyst coated membrane, the coating including:
coating the membrane material with the catalytic material such that the coating direction has an angle that is not equal to 90° and not equal to 0° with respect to the two outer sides of each of the nonrectangular active areas;
wherein the two outer sides of the nonrectangular active area of the respective catalyst coated membrane and the two outer sides of the nonrectangular active area of an adjacent catalyst coated membrane are oriented parallel with respect to one another on the membrane material.

5. The method according to claim 4 wherein the membrane material is a strip-like cut with parallel longitudinal sides and the coating direction is parallel to the longitudinal sides of the membrane material.

6. The method according to claim 5 wherein each nonrectangular active area has at least four corners bounded by the two outer sides and a first pair of sides, wherein each of the first pair of sides have a length that is less than a length of each of the two outer sides; and
wherein the plurality of catalyst coated membranes is arranged on the membrane material such that the first pair of sides are oriented parallel to the longitudinal sides of the membrane material.

7. The method according to claim 1, further comprising after applying the catalytic material, fabricating the membrane material to a desired shape of the catalyst coated membrane.

8. The method according to claim 1, further comprising:
removing the catalytic material that was applied to the membrane material in areas outside of the catalyst coated membrane from the membrane material; and
recycling the catalytic material that had been removed.

9. The method according to claim 1 wherein the nonrectangular active area has at least at least six corners.

10. The method according to claim 1 wherein the angle of the coating direction has a maximum of 5° with respect to a first pair of sides, the nonrectangular active area defined, at least in part, by the first pair of sides and the two outer sides.

11. The method according to claim 1 wherein the angle of the coating direction is no more than 0° with respect to a first pair of sides, the nonrectangular active area defined, at least in part, by the first pair of sides and the two outer sides.

12. The method according to claim 4 wherein the membrane material is a continuous strip.

13. The method according to claim 1 wherein the producing of the catalyst coated membrane further includes forming operating media ports arranged outside of the nonrectangular active area of the catalyst coated membrane for supplying and removing operating media to and from a fuel cell.

14. The method according to claim 1, further comprising:
after the producing, arranging the catalyst coated membrane between bipolar plates in a fuel cell.

15. The method according to claim 4 wherein the producing of the catalyst coated membrane further comprises, after coating the membrane material with the catalytic material, fabricating the membrane material of each of the plurality of catalyst coated membranes to a desired shape of the catalyst coated membrane.

16. The method according to claim 4, further comprising:
after the producing, stacking each of the plurality of catalyst coated membranes alternately with bipolar plates in a fuel cell.

* * * * *